UNITED STATES PATENT OFFICE.

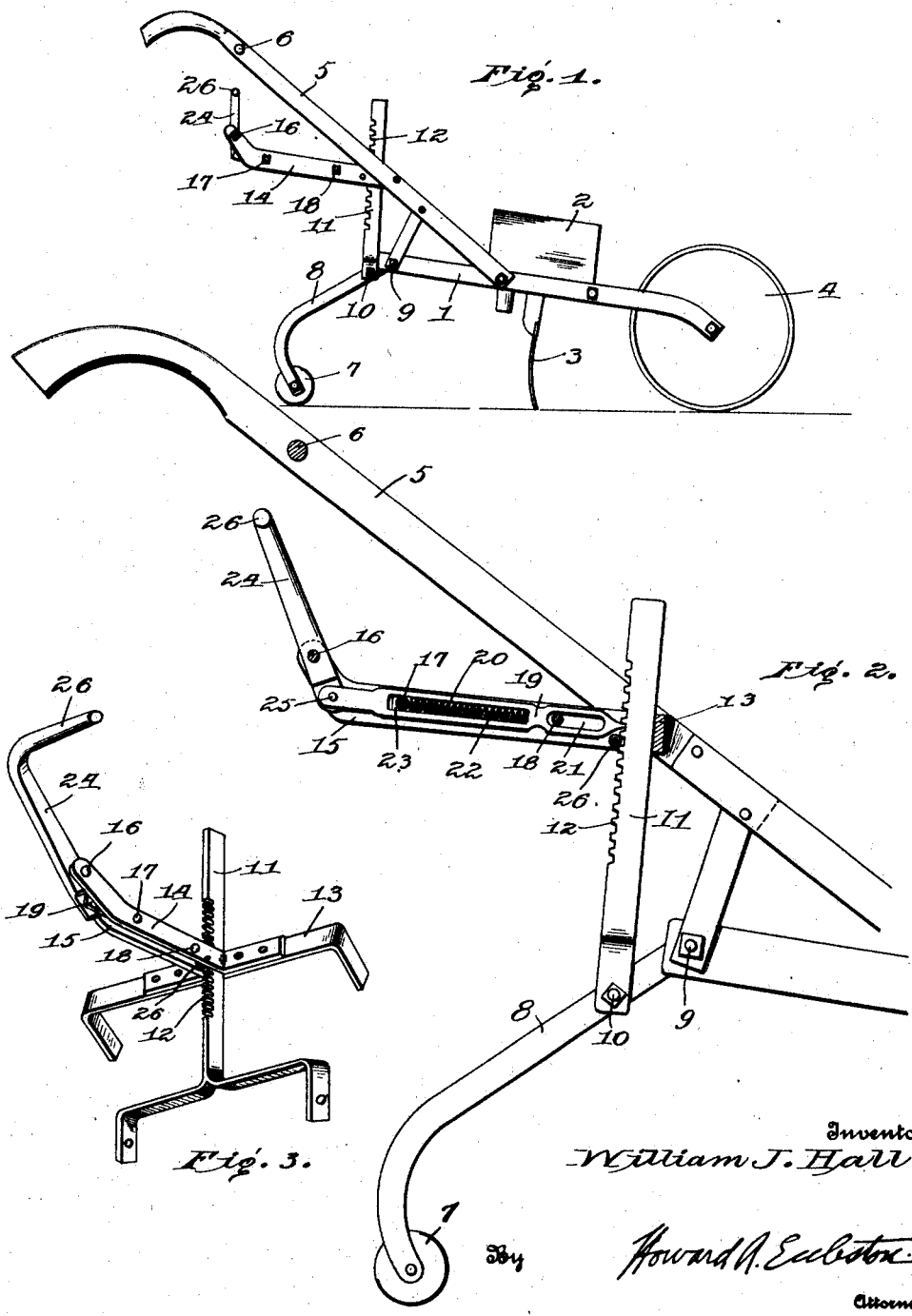

WILLIAM J. HALL, OF RINGGOLD, LOUISIANA.

PLANTER.

1,396,683.  Specification of Letters Patent.  Patented Nov. 8, 1921.

Application filed May 27, 1920. Serial No. 384,667.

*To all whom it may concern:*

Be it known that I, WILLIAM J. HALL, a citizen of the United States, residing at Ringgold, in the parish of Bienville and State of Louisiana, have invented certain new and useful Improvements in Planters; and I do hereby declare the following to be a full, clear, and exact description of the invention, such as will enable others skilled in the art to which it relates to make and use the same.

My invention relates to planters, such as corn or cotton planters, and has for an object to provide a machine of this character which may be quickly and easily adjusted for varying depths.

A further object of my invention is to provide a machine of this character with a depth varying attachment which will maintain the roller in line with the wheel.

A still further object is to provide an attachment of this character which may be applied to any type of planter having a roller.

It is not new to provide planters with adjustable rollers and I do not claim such a construction broadly. There are, however, certain deficiencies in depth varying planters now known. In the first place, the adjustments are more or less crude and the trouble encountered in adjusting them is so great that the operator will often not take the necessary time and trouble to make the proper adjustment. Further, with adjustments now known there is a tendency for the planter to lean to one side, thus making it almost impossible to hold the planter on a row. Still another defect is that the roller is not always maintained in line with the wheel.

Having briefly set forth a few of the obstacles which I seek to overcome, I will now proceed to describe my invention in detail, reference being had to the accompanying drawings in which:

Figure 1 is a side elevation of the planter.

Fig. 2 is a side view of the rear portion of the planter on an enlarged scale, parts being broken away to more clearly show the mechanism for adjusting the roller, and Fig. 3 is a detail perspective view of the adjusting means.

The frame 1 may be of the usual or any desired form and has mounted thereon a seed hopper 2 and a furrow-opening plow 3, both of which may be of any desired type and are here shown more or less diagrammatically as they form no part of the present invention.

A wheel 4 is mounted at the forward end of the planter, and extending upwardly from the rear portion of the frame are the usual handle members 5, between which extends the tie rod 6.

A roller 7 is rotatably carried by substantially parallel arms 8 which extend upwardly and are pivotally attached to the frame 1 at the point 9, as clearly shown. Extending substantially vertically from the roller carrying arms 8 and pivotally attached thereto at the point 10, is a rack arm 11 provided with a rack 12. As shown in Fig. 3, the rack arm is forked at its lower end, the forks being curved outwardly and downwardly so as to be attached to the parallel arms 8, as described.

A bar 13 extends between the handle members, and attached thereto in any suitable manner are two parallel plates 14 and 15 which may be secured together by bolts 16, 17 and 18, or otherwise as desired. It will be noted that in Fig. 2 the plate 15 has been removed to more clearly show the adjusting means.

A spring pressed pawl 19, having two slots 20 and 21 therein, is mounted to reciprocate between the two plates 14 and 15, and to engage the rack 12. The bolt, rivet, or the like 18, extends through the slot 21, and thus holds the forward end of the pawl in proper position, though, of course, permitting a reciprocating movement. The bolt 17 passes through the slot 20, and mounted within this slot is a coil spring 22, having one end engaging the end wall of the slot and the other end engaging a collar 23 carried by the bolt 17. It is apparent from this construction that the pawl is guided in its reciprocating movement by the bolts 17 and 18, while the spring 22 normally forces the pawl forward into engagement with the rack 12.

Pivotally mounted on the bolt 16, between the plates 14 and 15, is a trigger 24 which is pivotally attached at its lower end to the pawl 19, as indicated at 25. A finger grip 26 of the character desired may be integral with or attached to the trigger.

The operation of varying the depth of the plow will be obvious from the above description. The trigger is drawn slightly forward thereby releasing the pawl and permitting the frame to be raised or lowered to the extent desired. Then upon releasing the trigger the pawl springs into engagement with the rack and holds the frame in its adjusted position, in practice, one of the hands would remain on one of the handles 5 while the other hand would engage the tie rod 6 and finger grip 26, then by merely closing the hand the pawl would be disengaged from the rack and both hands are available for raising and lowering the frame.

Having fully described my invention, what I claim as new and desire to secure by Letters Patent is:

1. A planter including a main frame, handles attached thereto, a plow carried by said frame and means for adjusting the depth of the plow, said means including arms pivotally attached to the frame, a roller carried by said arms, a rack forked at its lower portion, said forks being pivotally attached to said arms, whereby the rack is located substantially on the center line of the planter, a spring pressed pawl engaging said rack, and means for disengaging said pawl.

2. A planter including a main frame, handles attached thereto, a tie rod extending between the handles, a plow carried by said frame and means for adjusting the depth of the plow, said means including arms pivotally attached to the frame, a roller carried by said arms, a rack forked at its lower portion, said forks being pivotally attached to said arms, whereby the rack is located substantially on the center line of the planter, a spring pressed pawl for engaging the rack, a trigger for disengaging the pawl, the trigger being adjacent to the tie rod.

3. A planter including a main frame, handles attached thereto, a tie rod extending between the handles, a plow carried by said frame, and means for adjusting the depth of said plow, said means including arms pivotally attached to the frame, a roller carried by said arms, a rack forked at its lower portion, said forks being pivotally attached to said arms, whereby the rack is located substantially on the center line of the planter, two substantially parallel plates supported adjacent to the rack, a spring pressed pawl slidably carried by said plates and adapted to engage the rack, a trigger pivotally mounted on said plates and pivotally attached to said pawl, the free end of the trigger being in close relation to said tie rod.

WILLIAM J. HALL.